(12) United States Patent
Tanaka

(10) Patent No.: US 7,634,182 B2
(45) Date of Patent: Dec. 15, 2009

(54) LENS APPARATUS

(75) Inventor: Junichi Tanaka, Saitama (JP)

(73) Assignee: Fujinon Corporation, Saitama-Shi, Saitama (JP)

( * ) Notice: Subject to any disclaimer, the term of this patent is extended or adjusted under 35 U.S.C. 154(b) by 331 days.

(21) Appl. No.: 11/706,273

(22) Filed: Feb. 15, 2007

(65) Prior Publication Data

US 2007/0196093 A1    Aug. 23, 2007

(30) Foreign Application Priority Data

Feb. 17, 2006    (JP)    ............... 2006-040202

(51) Int. Cl.
- G03B 17/00    (2006.01)
- G03B 13/34    (2006.01)
- G02B 15/14    (2006.01)
- G03B 13/00    (2006.01)
- G03B 3/10    (2006.01)

(52) U.S. Cl. .................. 396/80; 348/345; 348/357; 396/133

(58) Field of Classification Search .......... 396/48, 396/79–83, 133, 135, 136, 301, 303; 348/345, 348/347, 357

See application file for complete search history.

(56) References Cited

U.S. PATENT DOCUMENTS 5,774,748 A * 6/1998 Ito et al. ............... 396/80
6,014,523 A * 1/2000 Oono et al. ............ 396/48
6,055,378 A * 4/2000 Oono et al. ............ 396/82
6,282,379 B1    8/2001 Ide et al. .............. 396/89

FOREIGN PATENT DOCUMENTS

| DE | 19757342 A1 | 6/1998 |
|----|-------------|--------|
| EP | 1494464 A2 | 1/2005 |
| JP | 1-257924 A | 10/1989 |
| JP | 5-58163 B2 | 8/1993 |
| JP | 8-86951 A | 4/1996 |
| JP | 2773876 B2 | 4/1998 |

* cited by examiner

*Primary Examiner*—Melissa J Koval
(74) *Attorney, Agent, or Firm*—Birch, Stewart, Kolasch & Birch, LLP

(57) ABSTRACT

A lens apparatus which can remove a backlash positively is provided. In the lens apparatus, a drive source is controlled so as to performing: moving a focus lens from a reference position toward one end of an optical lens stroke, and moving the focus lens toward the other end of the optical lens stroke. When the focus lens reaches the other end of the optical lens stroke, the drive source is controlled so as to perform moving the focus toward the reference position, and further, when a focus point position is determined to be between the reference position and the other end of the optical lens stroke as well as when it is detected that the focus lens reaches the reference position, the drive source is controlled so as to perform moving the focus lens from the reference position toward one end of the optical lens stroke by an amount to removal of a backlash, and moving the focus lens up to the focus point position.

5 Claims, 13 Drawing Sheets

LENS APPARATUS

BACKGROUND OF THE INVENTION

1. Field of the Invention

The present invention relates to a lens apparatus. Specifically, the invention relates to a lens apparatus comprising a focus lens to be moved forward or backward within an optical lens stroke by a driving force transmitted through a gear train from a drive source.

2. Description of Related Art

In the related art, there is known a lens apparatus comprising a lens which is allowed to move forward or backward by a driving force transmitted through a gear train from a drive source.

In this type of lens apparatus, generally, as a drive source, there is used a pulse motor (a stepping motor). When a driving force is transmitted through a gear train, a lens can be driven with higher resolution than that of the stepping motor (that is, with precision of a several $\mu$ unit).

However, since there exists a backlash in the gear train, when driving a lens, even if a lens drive amount (the number of pulses applied to the pulse motor) reaches a given value, the actual lens moving amount is smaller than the given value by an amount of play caused by the backlash of gears. Or, when the lens drive amount is a minute amount (for example, when the lens drive amount is smaller than the amount of play), the pulse motor is driven but the lens is not moved at all.

In view of this, in the related art, to solve such issues caused by the backlash in the gear train, for example, there are known a method for executing a given calculation or the like to set a backlash amount and thereby remove the backlash uniformly (Japanese patent No. 2773876), and a method in which data corresponding to an error caused by the backlash are previously prepared and, when the driving direction of the drive motor varies, a correction corresponding to the error is added to the drive amount of the drive motor (JP-B-5-58163).

However, since the method disclosed in Japanese patent No. 2773876 is a method in which a calculation or the like is executed using various parameters to thereby remove the backlash, under a given condition, the backlash can be removed but, out of the given condition, the backlash cannot be removed. Also, because the method disclosed in JP-B-5-58163 is a method for correcting the data on the drive amount of the drive motor, similarly, the backlash can be removed under a given condition but the backlash cannot be removed completely under the other remaining conditions.

SUMMARY OF THE INVENTION

An object of an illustrative, non-limiting embodiment of the invention is to provide a lens apparatus comprising a focus lens to be moved forward or backward within an optical lens stroke by a driving force transmitted through a gear train from a drive source, in which a backlash can be removed positively.

According to an aspect of the present invention, there is provided a lens apparatus comprising: a focus lens; a drive source generating a driving force to move the focus lens forward or backward within an optical lens stroke of the focus lens; a gear train transmitting the driving force to the focus lens; and a sensor detecting that the focus lens reaches a reference position in the optical lens stroke. The drive source is controlled so as to perform: a first step of moving the focus lens from the reference position to a first end of the optical lens stroke and moving the focus lens from the first end to a second end of the optical lens stroke, while AF evaluation values (values for evaluating a position, in the optical lens stroke, of the focus lens coming into focus) with respect to positions of the focus lens are obtained to determine the position, in the optical lens stroke, of the focus lens coming into focus; and a second step of moving the focus lens from the second end of the optical lens stoke toward the reference position. Further, when the position of the focus lens coming into focus is determined to be between the reference position and the second end of the optical lens stroke and when the sensor detects that the focus lens reaches the reference position in the second step, the drive source is controlled so as to perform: a third step of moving the focus lens from the reference position toward the first end of the optical lens stroke by a distance to remove a backlash of the gear train; and a fourth step of moving the focus lens up to the position of the focus lens coming into focus.

According to the lens apparatus, AF evaluation values with respect to the positions of the focus lens are obtained over the entire area of the optical strokes, the position of the focus lens coming into focus is determined to be between the reference position and the second end of the optical lens stroke, and, when the sensor detects that the focus lens has reached the reference position, the focus lens is allowed to move from the reference position toward the first end of the optical lens stroke by an amount (a distance) to remove a backlash of the gear train. And, after the backlash is removed, the focus lens is moved up to the position of the focus lens coming into focus. Therefore, the backlash can be removed positively.

In the lens apparatus, when the position of the focus lens coming into focus is determined to be between the reference position and the first end of the optical lens stroke and when the sensor detects that the focus lens reaches the reference position in the second step, the drive source may be controlled so as to perform a step of moving the focus lens from the reference position to the position of the focus lens coming into focus.

According to the lens apparatus, when the position of the focus lens coming into focus is determined to be between the reference position and the first end of the optical lens stroke as well as when the sensor detects that the focus lens has reached the reference position, the focus lens is allowed to move up to the position of the focus lens coming into focus, without performing the movement to remove the backlash. Therefore, the AF operation can be performed quickly.

According to an aspect of the present invention, there is provided a lens apparatus comprising: a focus lens; a drive source generating a driving force to move the focus lens forward or backward within an optical lens stroke of the focus lens; a gear train transmitting the driving force to the focus lens; and a sensor detecting that the focus lens reaches a reference position in the optical lens stroke. The drive source is controlled so as to perform: a first step of moving the focus lens from the reference position toward a first end of the optical lens stroke; and a second step of moving the focus lens toward the reference position at a timing after a position of the focus lens coming into focus is determined to be between the reference position and the first end of the optical lens stroke. Further, when the sensor detects that the focus lens reaches the reference position in the second step, the drive source is controlled so as to perform: a third step of moving the focus lens from the reference position toward the second end of the optical lens stroke by a distance a distance to remove a backlash of the gear train; and a fourth step of moving the focus lens up to the position of the focus lens coming into focus.

According to the lens apparatus, AF evaluation values with respect to the positions of the focus lens are obtained (for example, while the focus lens is moving from the reference position within the optical lens stroke toward the first end of the optical lens stroke), the position of the focus lens coming into focus is determined to be between the reference position and the first end of the optical lens stroke (that is, in the range where the focus lens has moved actually), and, when the sensor detects that the focus lens has reached the reference position, the focus lens is allowed to move from the reference position toward the second end of the optical lens stroke by an amount (a distance) to remove a backlash of the gear train. And, after the backlash is removed, the focus lens is allowed to move up to the position of the focus lens coming into focus (the position of the focus lens coming into focus is decided within the range where the focus lens has moved actually). Therefore, the backlash can be removed positively and quickly. Further, the AF operation can be carried out while controlling the lens without moving it more than optically necessary.

According to an aspect of the present invention, there is provided a lens apparatus comprising: a focus lens; a drive source generating a driving force to move the focus lens forward or backward within an optical lens stroke of the focus lens; a gear train transmitting the driving force to the focus lens; and a sensor detecting that the focus lens reaches a reference position in the optical lens stroke. The drive source is controlled so as to perform a first step of moving the focus lens toward one of a first and second ends of the optical lens stroke. Further, when the sensor detects that the focus lens reaches the reference position in the first step and when a first direction in which the focus lens is planned to move is determined, the drive source is controlled so as to perform: a step of moving the focus lens from the reference position in a second direction opposite to the first direction by a distance a distance to remove a backlash of the gear train; and a step of moving the focus lens in the first direction.

According to the lens apparatus, when the focus lens moves, the focus lens is allowed to move by a given amount in the direction opposite to the direction in which the focus lens is planned to move (from the reference position to the first end, the second end or the position, in the optical lens stroke, of the focus lens coming into focus), thereby being able to cancel the backlash. Therefore, the backlash can be removed positively.

In the lens apparatus, the first step may comprise: a step of moving the focus lens to one of a first and second ends of the optical lens stroke; and a step of moving the focus lens from the one of the first and second ends toward the reference position.

According to the lens apparatus, when the focus lens moves, the focus lens is allowed to move by a given amount in the direction opposite to the direction in which the focus lens is planned to move (from the reference position to the first end, the second end or the position, in the optical lens stroke, of the focus lens coming into focus), thereby being able to cancel the backlash. Therefore, the backlash can be removed positively.

BRIEF DESCRIPTION OF THE DRAWINGS

The features of the invention will appear more fully upon consideration of the exemplary embodiment of the invention, which are schematically set forth in the drawings, in which.

DETAILED DESCRIPTION OF THE EXEMPLARY EMBODIMENTS

Although the invention will be described below with reference to the exemplary embodiments thereof, the following exemplary embodiments and modifications do not restrict the invention.

According to an exemplary embodiment, there is provided a lens apparatus including a focus lens to be moved forward or backward within an optical lens stroke by a driving force transmitted through a gear train from a drive source, wherein the backlash can be removed positively.

Now, description will be given below of a lens apparatus according to exemplary embodiments of the invention with reference to the accompanying drawings.

Figure 1:
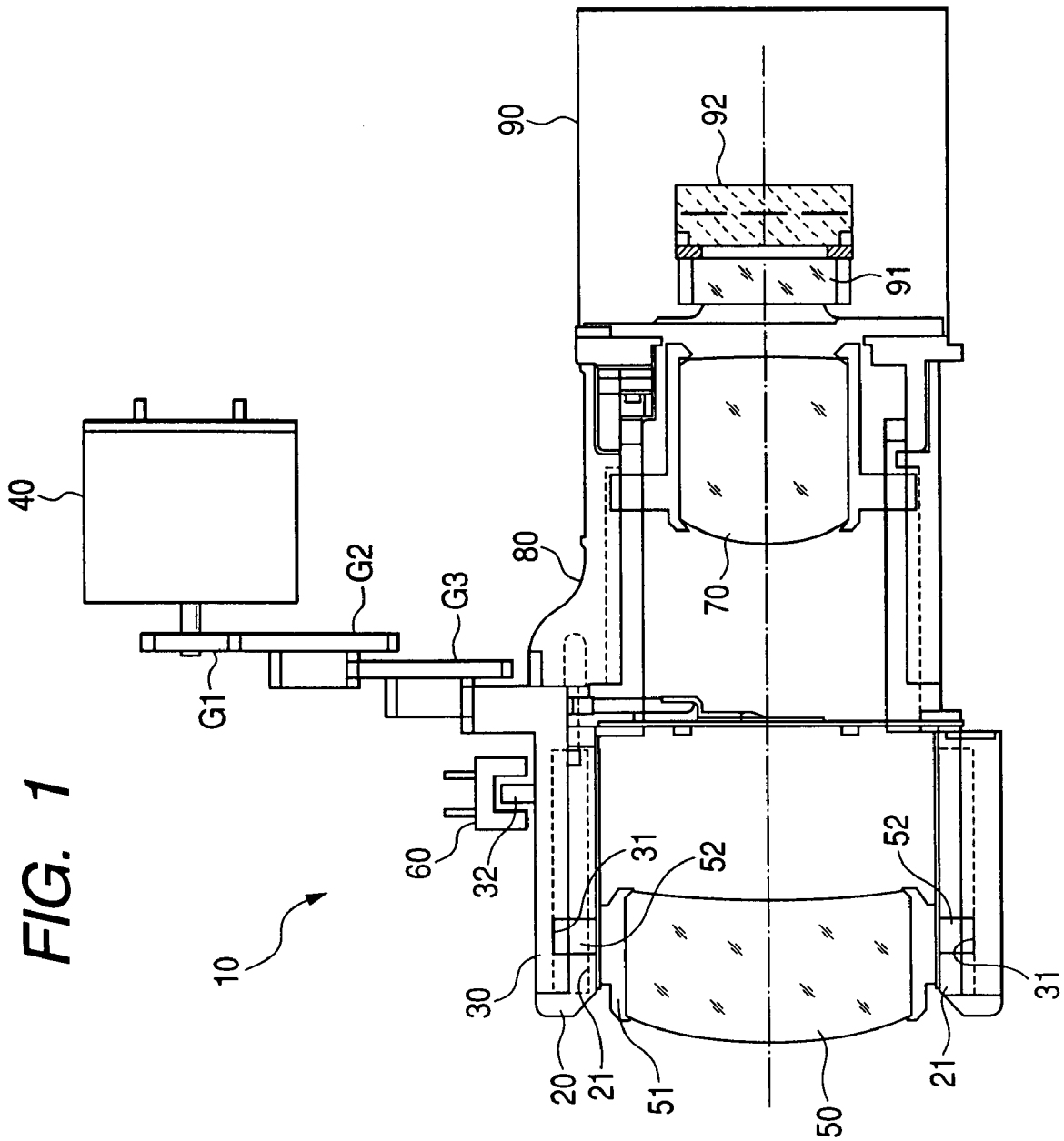
FIG. 1 shows a lens apparatus of an exemplary embodiment according to the invention.

FIG. 1 shows a lens apparatus 10 according a first embodiment of the invention.

As shown in FIG. 1, on the outer periphery of a lens apparatus main body 20, there is rotatably mounted a focus ring 30. Between the focus ring 30 and a stepping motor 40, there is arranged a gear train G (which is composed of a first gear G1 mounted on the rotation shaft of the stepping motor 40, a second gear G2 meshingly engaged with the first gear G1, and a third gear G3 meshingly engaged with the second gear G2) which is used to transmit the driving force of the stepping motor 40. The focus ring 30 is in meshing engagement with the third gear G3 and can be driven and rotated by a driving force transmitted through the gear train G from the stepping motor 40. Use of the gear train G makes it possible to drive a focus lens 50 with higher resolution than that of the stepping motor 40 (that is, with precision of a several μ unit).

In the inner peripheral surface of the focus ring 30, there is formed a cam groove 31 and, into this cam groove 31, there are inserted pins 52 (in FIG. 1, there are shown two pins) which are provided on a lens frame 51 for holding the focus lens 50 through longitudinal grooves 21 (penetration holes extending in the optical axis direction. In FIG. 1, there are shown two longitudinal grooves) respectively formed in the lens apparatus main body 20. Therefore, when the focus ring 30 is driven and rotated, the focus lens 50 is moved forward or backward along the longitudinal grooves 21 (that is, in the optical axis direction).

Figure 2:
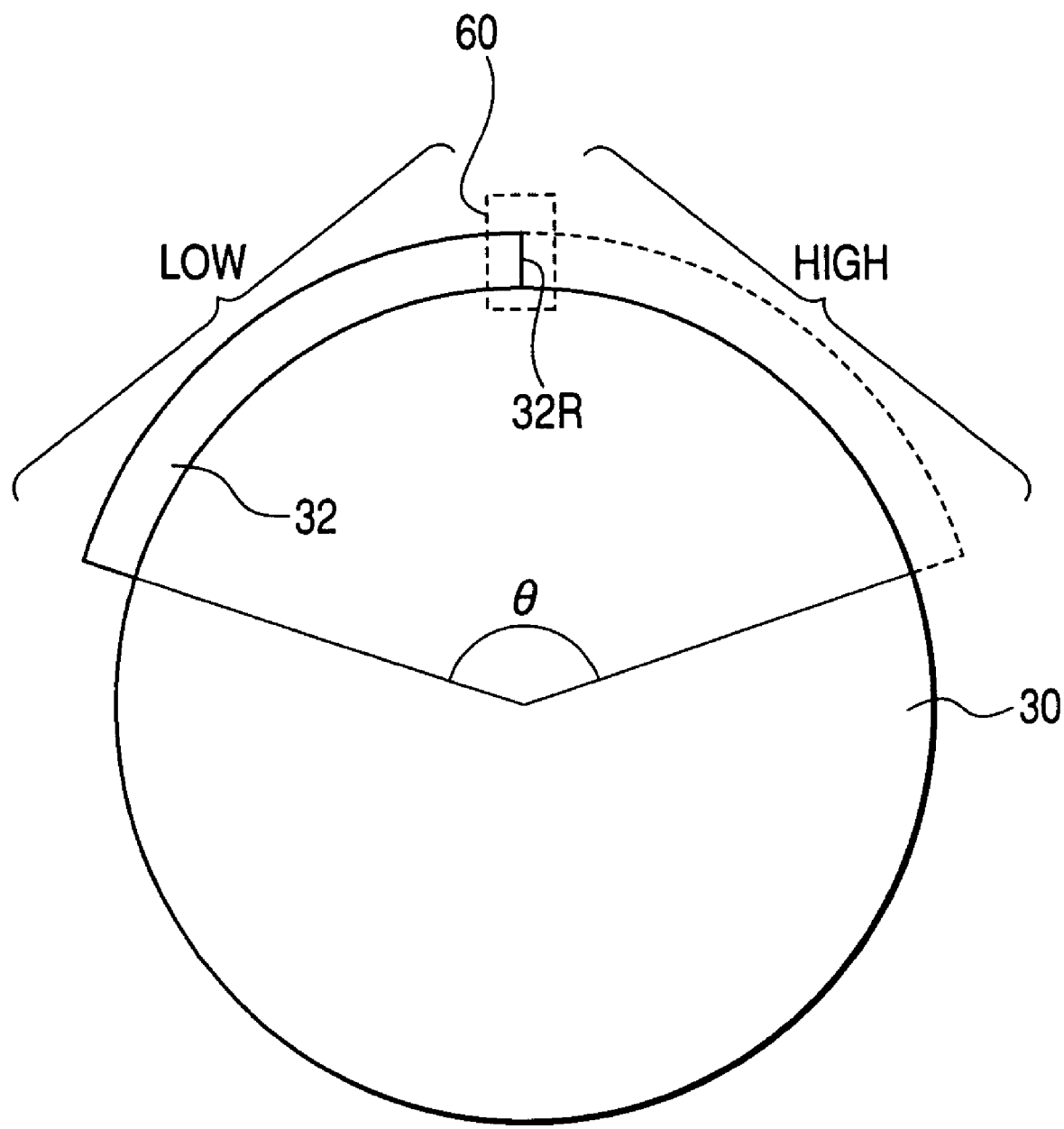
FIG. 2 shows an exemplary embodiment of a shading plate and a photo interrupter.

As shown in FIG. 2, the rotation amount of the focus ring 30 is regulated in such a manner that it can be driven and rotated only by a preset angle θ. For example, when a projecting portion (not shown) is provided on the focus ring 30 and the focus ring 30 is driven and rotated in one direction, the projecting portion is contacted with an engaging member (not shown) to thereby prevent the focus ring 30 from rotating further in that direction; and, when the focus ring 30 is driven and rotated in the opposite direction, the projecting portion is contacted with the engaging member to thereby prevent the focus ring 30 from rotating further in that direction.

In the lens apparatus 10 according to the present embodiment, owing to the above-mentioned regulation of the rotation amount of the focus ring 30, the focus lens 50 is allowed to reciprocate between one end and the other end (between a mechanical end (MOD) and a mechanical end (INf)) of an optical lens stroke.

As shown in FIGS. 1 and 2, on the outer peripheral surface of the focus ring 30, there is disposed a shading plate 32 which extends in the peripheral direction of the focus ring 30. The shading plate 32 is used to shade a photo interrupter 60. When the focus ring 30 is driven and rotated and the shading plate 32 shades the photo interrupter 60, the photo interrupter 60 outputs LOW, whereas when the shading plate 32 does not shade the photo interrupter 60, the photo interrupter 60 outputs HIGH.

Therefore, firstly, by detecting whether the output of the photo interrupter 60 is LOW or HIGH, it is possible to know that the focus lens 50 is situated in any of right and left optical lens strokes (hereinafter, in some cases, the left optical lens stroke is referred to as a LOW area, whereas the right optical lens stroke is referred to as a HIGH area) with a reference position (see FIG. 4) set in the optical lens stroke as the boundary thereof. Secondly, by detecting the change of the output of the photo interrupter 60 (from LOW to HIGH or from HIGH to LOW), it is possible to know whether the focus lens 50 has reached the reference position or not.

In the lens apparatus 10 according to the present embodiment, the reference position is set substantially in the center of the optical lens stroke.

The length of the shading plate 32 is set for a length which is suitable to detect the reference position (even when the reference position is set at a position rightward or leftward from the center of the optical lens stroke, by setting the length of the shading plate 32 for a length suitable for detection of the reference position, it is possible to know whether the focus lens 50 has reached the reference position or not).

In the lens apparatus 10 according to the present embodiment, as described above, the reference position is set substantially in the center of the optical lens stroke. However, the reference position varies according to the respective lens apparatus 10 due to the mounting error of the shading plate 32 and photo interrupter 60, or due to the error of the photo interrupter 60 itself, or due to other similar error.

Owing to such variation, the number of pulses (the number of pulses applied to the stepping motor 40) necessary for the focus lens 50 to reach one or the other end of the optical lens stroke (the mechanical end (MOD) or the mechanical end (INf)) from the reference position varies according to the respective lens apparatus 10.

According to the present embodiment, there is employed the following structure in order that, even when the reference position varies according to the respective lens apparatus 10, the focus lens 50 is surely able to reach one or the other end of the optical lens stroke (the mechanical end (MOD) or the mechanical end (INf)) from the reference position.

That is, for each lens apparatus 10, there are measured or calculated the number of pulses P1 to be applied to the stepping motor 40 to move the focus lens 50 from the reference position to one end (the mechanical end (MOD)) of the optical lens stroke as well as the number of pulses P2 to be applied to the stepping motor 40 to move the focus lens 50 to the other end (the mechanical end (INf)) of the optical lens stroke; and, these numbers of pulses P1 and P2 are stored in a memory (not shown).

These numbers of pulses P1 and P2 are measured or calculated, for example, before the lens apparatus 10 is shipped from a factory. Now, description will be given below of this measuring operation with reference to FIGS. 10 and 11.

Figure 10:
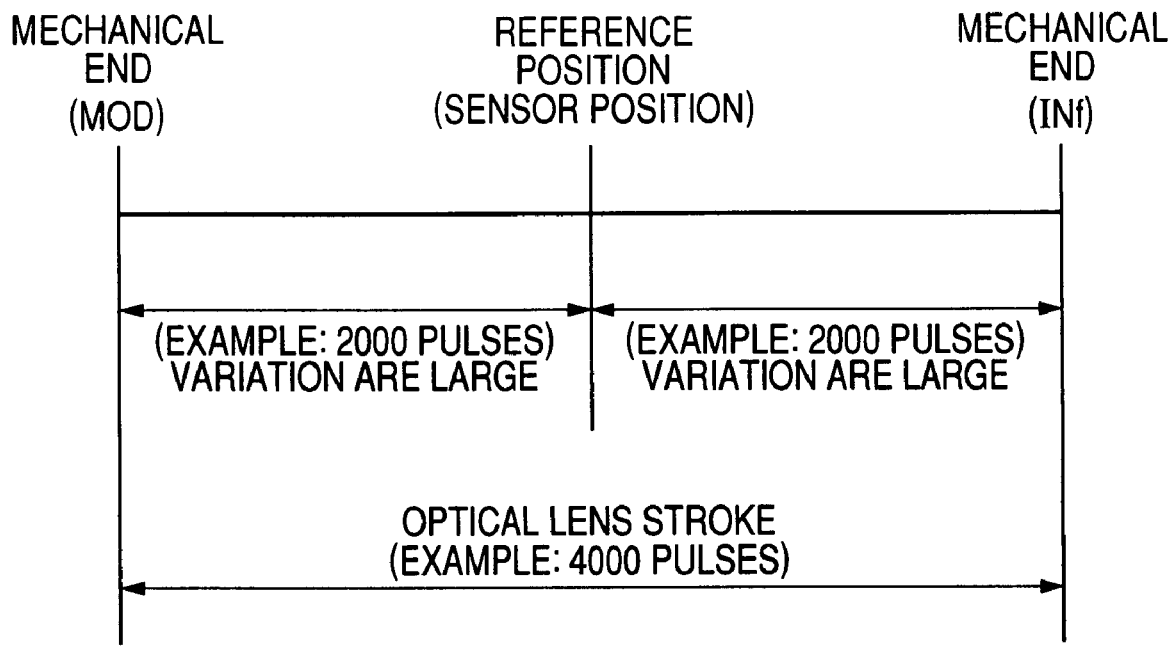
FIG. 10 shows an operation to measure or calculate the pulse numbers P1 and P2.
Figure 11:
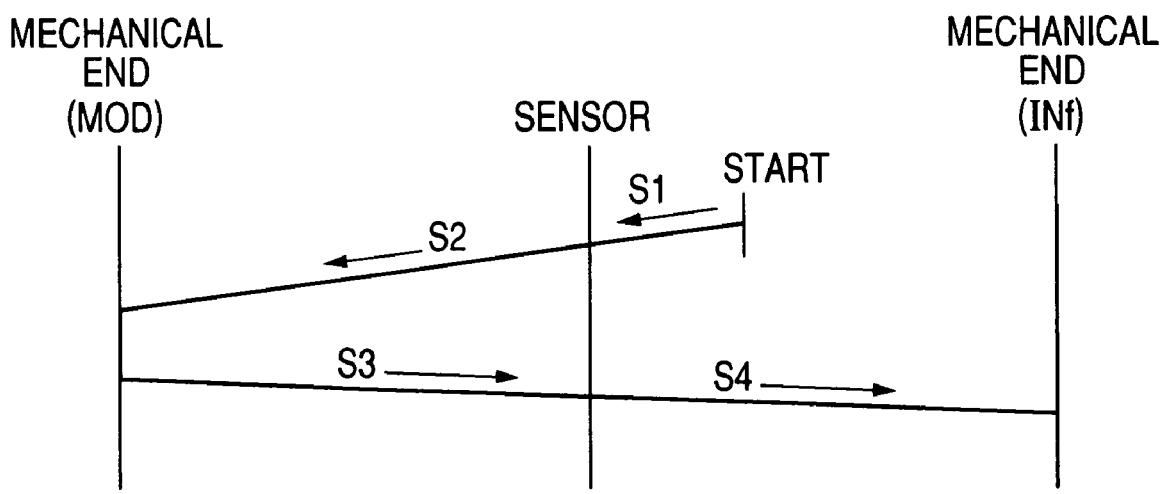
FIG. 11 shows an operation to measure or calculate the pulse numbers P1 and P2.

FIGS. 10 and 11 show that, suppose an ideal state in which the reference position is set in the center of the mechanical end (MOD) and mechanical end (INf) with no error, the reference position is set in such a manner that the number of pulses necessary for the focus lens 50 to reach one or the other end (the mechanical end (MOD) or the mechanical end (INf)) of the optical lens stroke (the number of pulses to be applied to the stepping motor 40) provides 2000 pulses.

The number of pulses P1 to be applied to the stepping motor 40 to move the focus lens 50 from the reference position to one end (the mechanical end (MOD)) of the optical lens stroke is measured in the following manner.

Firstly, the stepping motor 40 is controlled in such a manner that the focus lens 50 is allowed to move from its original stop position toward one end of the optical lens stroke (the mechanical end (MOD)) (Step S1). When it is detected that the focus lens 50 moves and reaches the reference position (that is, when the change (from HIGH to LOW) of the output of the photo interrupter 60 is detected), a counter for counting the feed amount of the focus lens 50 is reset.

Next, in order to surely move the focus lens 50 from the reference position to one end (the mechanical end (MOD)) of the optical lens stroke, to the stepping motor 40, there are applied pulses larger in number by a given number than the ideal-state pulses (2000 pulses), for example, 2500 pulses (Step S2).

Soon, the focus lens 50 reaches one end (the mechanical end (MOD)) of the optical lens stroke (that is, the projecting portion (not shown) provided on the focus ring 30 is butted against the engaging member (not shown). However, since 2500 pulses have been applied to the stepping motor 40, the stepping motor 40 is caused to rotate idly by an amount corresponding to a given number of pulses (stepping-out).

After 2500 pulses are applied to the stepping motor 40, the stepping motor 40 is controlled in such a manner that the focus lens 50 is allowed to move toward the other end (the mechanical end (INf)) of the optical lens stroke (Step S3). And, during the time while the focus lens 50 is moving from one end (the mechanical end (MOD)) of the optical lens stroke the reference position (in a state where a backlash exists), the number of pulses applied to the stepping motor 40 is counted. In this case, because the number of pulses counted includes the number of pulses corresponding to the backlash, for example, 2050 pulses are counted. The thus counted 2050 pulses (or, when an allowance is desired, a rather larger number of pulses, for example, 2100 pulses) are stored in a nonvolatile memory (not shown) such as a ROM as the number of pulses P1 peculiar to the present lens apparatus 10.

The number of pulses P2 to be applied to the stepping motor 40 to move the focus lens 50 from the reference position to the other end (the mechanical end (INf)) of the optical lens stroke is calculated by the following expression 1.

Number of pulses $P2$=number of pulses corresponding to entire area of optical lens stroke−$P1$+number of pulses with backlash taken into account  (Expression 1)

According to the present embodiment, pulses corresponding to the entire area of the optical lens stroke are 4000 pulses (see FIG. 10), P1 is 2050 pulses, and the pulses with the backlash taken into account are 200 pulses. Therefore, P2 is 2150 pulses (4000 pulses−2050 pulses+200 pulses). The thus counted 2150 pulses are stored in a nonvolatile memory (not shown) such as a ROM as the number of pulses P2 peculiar to the present lens apparatus 10.

When the numbers of pulses P1 and P2 peculiar to the respective lens apparatus are stored in the above-mentioned manner, the amount of stepping-out can be reduced and the thus reliability of the lens apparatus 10 can be enhanced accordingly.

The lens apparatus 10 further includes a structure necessary for the lens apparatus 10 to function as an ordinary lens apparatus; and, specifically, the lens apparatus 20 further includes a magnification change lens 70 and a zoom ring 80 for moving the magnification change lens 70 forward or backward in the optical axis direction. As shown in FIG. 1, on the lens apparatus 10, there can be mounted a camera apparatus 90 including a solid state imaging device 92 such as a CCD the image pickup surface of which is covered with a cover glass 91.

Next, description will be given below of the operation of the above-structured lens apparatus 10 with reference to the accompanying drawings.

Figure 3:
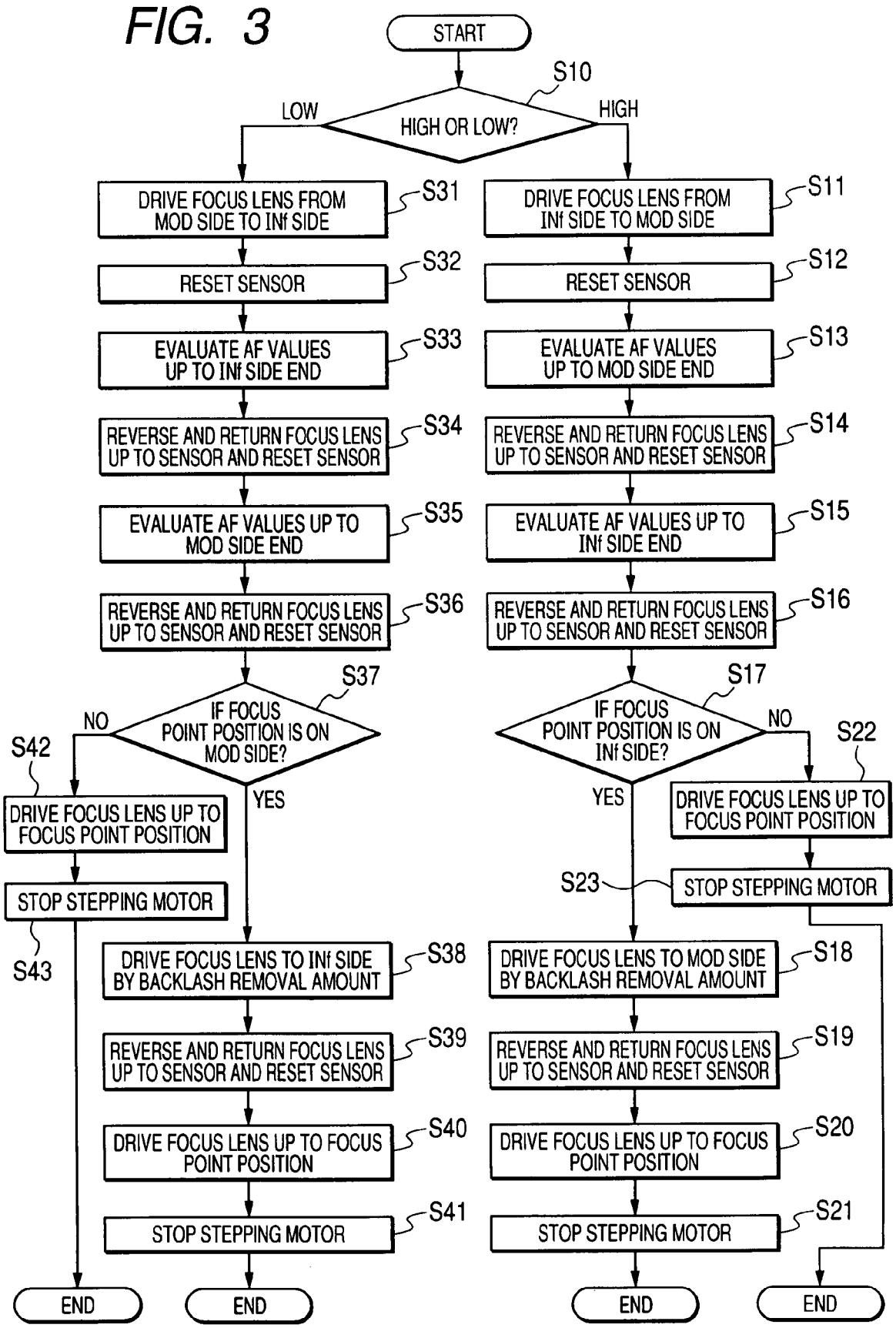
FIG. 3 is a flow chart of the operation (first embodiment) of the lens apparatus.
Figure 4:
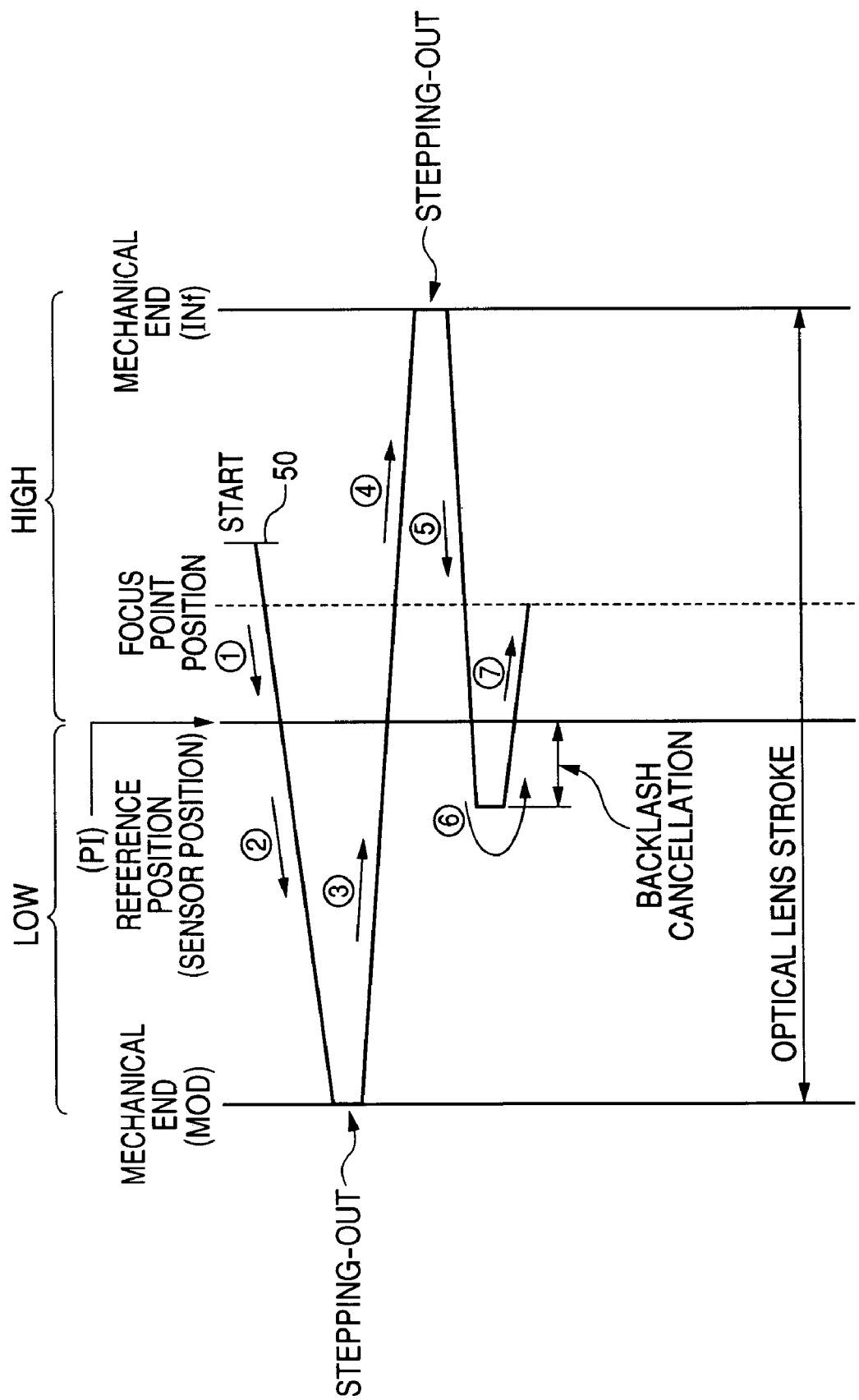
FIG. 4 shows the movement (first embodiment) of a focus lens.

FIG. 3 shows flow chart of the operation of the lens apparatus 10. FIG. 4 shows the movement of the focus lens 50.

The following operation can be realized by a control unit (not shown) such as a CPU reading a given program into a memory (not shown) and executing the program. By the way, the control unit and memory may be disposed within the lens apparatus 10 or may be disposed on the camera apparatus 90 side.

Firstly, when an AF (automatic focus) operation starts (or the power supply of the lens apparatus 10 is turned on), it is detected whether the output of the photo interrupter 60 is LOW or HIGH (Step S10).

As shown in FIG. 4, when the focus lens 50 is situated in (, of right and left optical lens strokes divided by a reference position set in an optical lens stroke) the right optical lens stroke (HIGH area), the shading plate 32 is situated at a position where it does not shade the photo interrupter 60. In this case, when the power supply is turned on, the output of the photo interrupter 60 becomes HIGH (Step S10: HIGH), and the stepping motor 40 is controlled in such a manner that the focus lens 50 is allowed to move from its original stop position toward one end (the mechanical end (MOD)) of the optical lens stroke (Step S11). When it is detected that the focus lens 50 moves and reaches the reference position (that is, when it is detected that the output of the photo interrupter 60 is changed (from HIGH to LOW), a counter for counting the feed amount of the focus lens 50 is reset (Step S12).

Next, in order to move the focus lens 50 from the reference position to the mechanical end (MOD), the pulse number P1 (here, 2050) is read out of the memory and the pulse number P1 is applied to the stepping motor 40.

Figure 5:
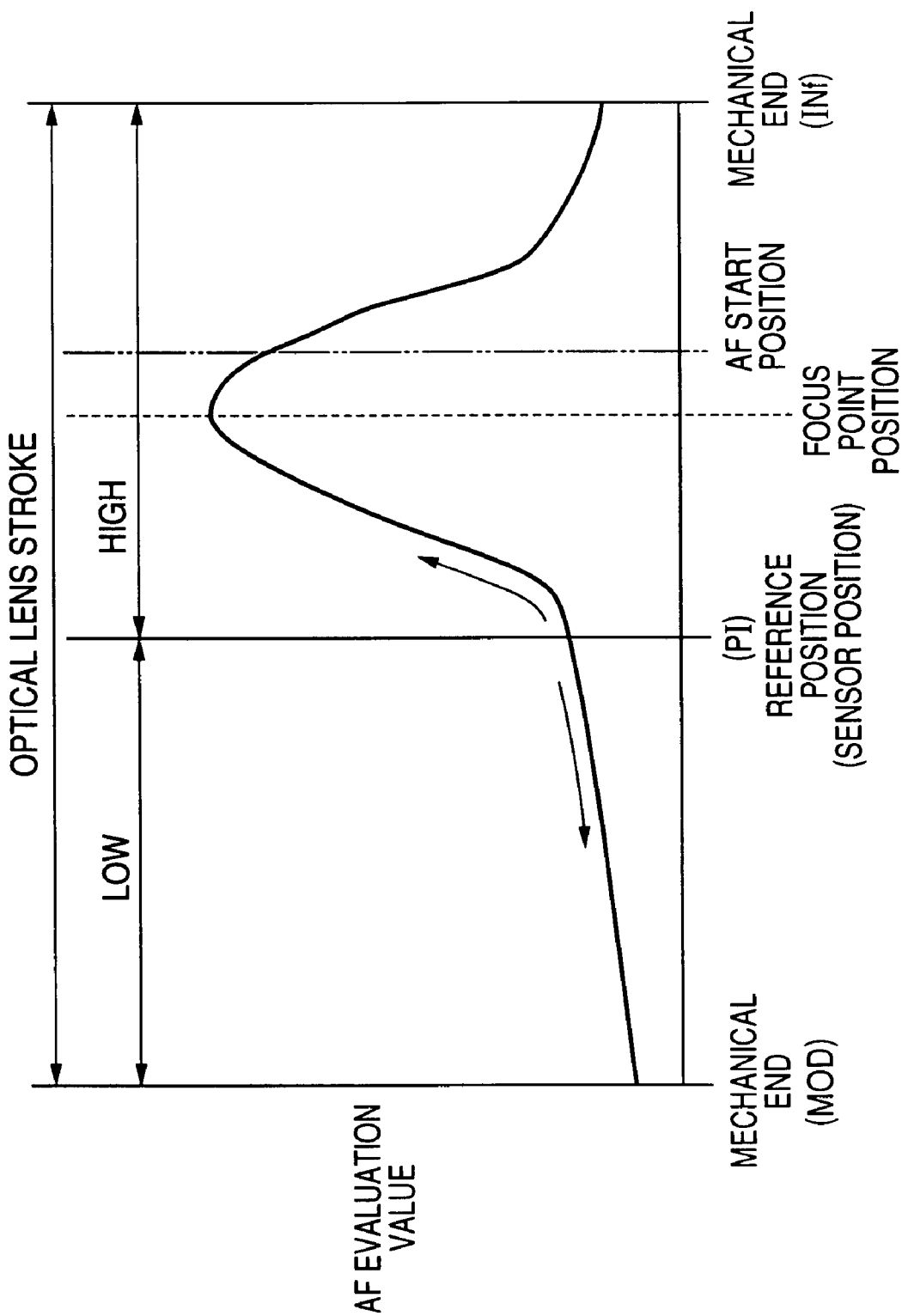
FIG. 5 shows an example of an AF evaluation value.

During the time while the focus lens 50 is moving from the reference position toward the mechanical end (MOD) in a state where no backlash is present, AF evaluation values are sampled according to the lens positions (Step S13). AF evaluation values may be obtained by AF evaluation value-obtaining means, which may be included in control unit. And, there is found a curve which passes through, of the two or more AF evaluation values sampled, two or more AF evaluation values including a maximum AF evaluation value; and, there is also found a lens position (i.e., a position of the focus lens coming into focus, which is hereinafter referred to as a "focus point position") where the curve becomes maximum. The focus point position may be determined by focus point position-determining means, which may be included in the control unit. FIG. 5 shows an example of the curve that passes through the AF evaluation values.

Soon, the focus lens 50 reaches the mechanical end (MOD) (that is, the projecting portion (not shown) provided on the focus ring 30 is butted against the engaging member (not shown), while 2050 pulses have been applied to the stepping motor 40. Therefore, the stepping motor 40 rotates idly by an amount corresponding to a given number of pulses (stepping-out).

After the pulse number P1 is applied to the stepping motor 40, the stepping motor 40 is controlled in such a manner that the focus lens 50 is allowed to move toward the other end (the mechanical end (INf)) of the optical lens stroke (Step S14) (during this operation, the sampling of the evaluation values is not carried out).

When it is detected that the focus lens 50 moves and reaches the reference position (that is, when it is detected that the output of the photo interrupter 60 is changed (from LOW to HIGH), the counter for counting the feed amount of the focus lens 50 is reset (Step S14). The reason why the counter is reset at the reference position in this manner is to prevent the following problem. That is, when the focus lens 50 is butted against one end (the mechanical end (MOD) of the optical lens stroke, the stepping motor 40 is caused to step out in the above-mentioned manner, which results in a problem that it is impossible to recognize the lens position in the control system.

Next, the pulse number P2 (here, 2150) is read out from the memory and is applied to the stepping motor 40 in order that the focus lens 50 is allowed to move from the reference position to the other end (the mechanical end (INf)) of the optical lens stroke.

During the time as well while the focus lens 50 is moving from the reference position toward the other end (the mechanical end (INf)) of the optical lens stroke with no backlash existing, the AF evaluation values are sampled according to the lens positions (Step S15). And, there is found a curve which passes through, of the two or more AF evaluation values sampled, two or more AF evaluation values including a maximum AF evaluation value; and, there is also found a lens position where the curve becomes maximum.

Soon, the focus lens 50 reaches the other end (the mechanical end (INf)) of the optical lens stroke (that is, the projecting portion (not shown) provided on the focus ring 30 is butted against the engaging member (not shown), while 2050 pulses have been applied to the stepping motor 40. Therefore, the stepping motor 40 rotates idly by an amount corresponding to a given number of pulses (stepping-out).

After the pulse number P2 is applied to the stepping motor 40, the stepping motor 40 is controlled in such a manner that the focus lens 50 is allowed to move toward the reference position (Step S16) (during this operation, the sampling of the evaluation values is not carried out). When it is detected that the focus lens 50 moves and reaches the reference position (that is, when it is detected that the output of the photo interrupter 60 is changed (from HIGH to LOW), the counter for counting the feed amount of the focus lens 50 is reset (Step S16).

Next, it is checked whether the focus point position is determined to be between the reference position and the other end (the mechanical end (INf)) of the optical lens stroke or not (Step S17). As shown in FIG. 5, when the focus point position is determined to be between the reference position and the other end (the mechanical end (INf)) of the optical lens stroke (Step S17: Yes), the stepping motor 40 is controlled such that the focus lens 50 is allowed to move from the reference position toward one end (the mechanical end (MOD)) of the optical lens stroke by an amount equivalent to a backlash removal (Step S18).

After then, the stepping motor 40 is controlled such that the focus lens 50 is allowed to move up to the reference position, and, when it is detected that the focus lens 50 reaches the reference position (that is, when it is detected that the output of the photo interrupter 60 is changed (from LOW to HIGH), the counter for counting the feed amount of the focus lens 50 is reset (Step S19).

And, the stepping motor 40 is controlled such that the focus lens 50 is allowed to move from the reference position up to the determined lens position (the focus point position) (Step S20, and then the stepping motor 40 is caused to stop (Step S21). This completes the AF operation.

As has been described above, according to the lens apparatus 10 of the present embodiment, the AF evaluation values according to the positions of the focus lens 50 are sampled over the entire area of the optical lens stroke (Steps S13 and S15); and, when the focus point position is determined to be between the reference position and the other end (the mechanical end (INf)) of the optical lens stroke as well as when it is detected by a sensor that the focus lens 50 reaches the reference position (that is, it is detected that the output of the photo interrupter 60 is changed (from HIGH to LOW), the focus lens 50 is allowed to move from the reference position toward one end (the mechanical end (MOD)) of the optical lens stroke by an amount equivalent to a backlash removal (Step S18). And, after the backlash is removed, the focus lens 50 is moved up to the determined focus point position (Step S20).

Thus, according to the lens apparatus 10, the backlash can be removed positively.

Figure 9:
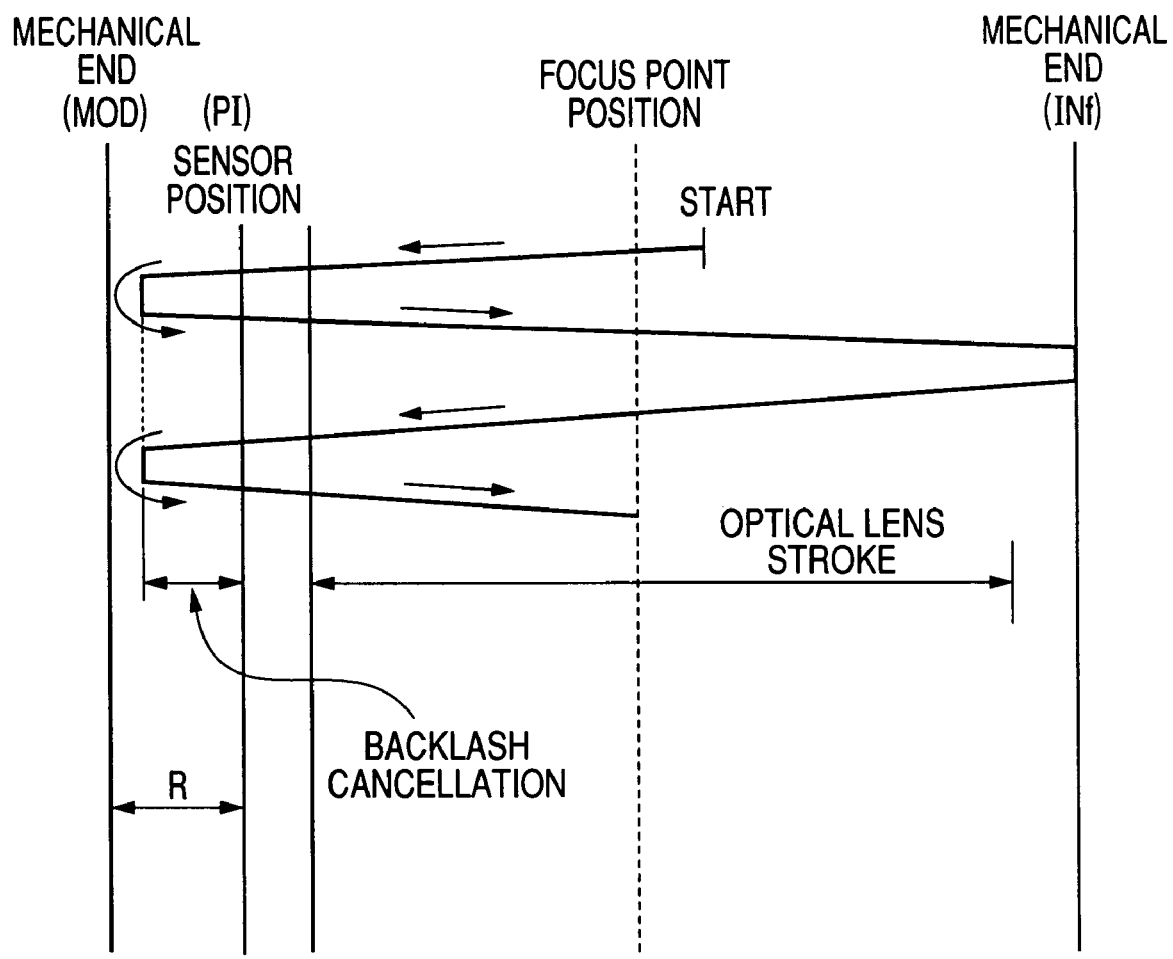
FIG. 9 shows the movement (the point at issue) of the focus lens.

By the way, as a method for removing the backlash, there can be expected such a method as shown in FIG. 9 in which, out of the range of the optical lens stroke, there are set an area R for cancellation of the backlash and a reference position and, whenever moving the focus lens 50 to a focus point position, after the focus lens 50 is moved to the area R, the focus lens 50 is then moved to the focus point position. However, use of this method requires, in addition to the optical lens stroke, the space R for removal of the backlash, which raises a problem that the length of a lens apparatus cannot be reduced. On the other hand, in the lens apparatus 10 according to the present embodiment, since the reference position is set within the range of the optical lens stroke, the AF operation can be executed by controlling the focus lens 50 without moving it beyond the lens stroke necessary for optical use.

On the other hand, when a focus point position is not determined to be between the reference position and the other end (the mechanical end (INf)) of the optical lens stroke (that is, when a focus point position is determined to be between the reference position and one end (the mechanical end (MOD)) of the optical lens stroke (Step 17: No), the stepping motor 40 is controlled such that the focus lens 50 is allowed to move from the reference position up to the determined lens position (focus point position) (Step S22), and the stepping motor 40 is then caused to stop (Step S23). In this case, because no backlash occurs, the backlash removing operations in the above-mentioned steps S18 to S21 are not executed.

That is, when a focus point position is determined to be between the reference position and one end (the mechanical end (MOD)) of the optical lens stroke and also when it is detected by a sensor that the focus lens 50 reaches the reference position (Step 17: No), without executing the movement by an amount equivalent to the removal of the backlash, the focus lens 50 moves up to the determined focus point position. Therefore, the AF operation can be executed quickly.

Next, description will be given below of a case where the focus lens 50 is situated within (, of the two right and left divisional optical lens strokes divided by the reference position set within the optical lens stroke) the left optical lens stroke (the LOW area). In this case, the shading plate 32 is situated at a position for shading the photo interrupter 60. Therefore, when the power supply is turned on, the output of the photo interrupter 60 becomes LOW (Step 10: LOW), and the stepping motor 40 is controlled such that the focus lens 50 is allowed to move from its original stop position toward one end (the mechanical end (MOD)) of the optical lens stroke (Step 31).

From now on, processings in steps S32 to S43 similar to the above-described processings in the steps S12 to S23 are executed. However, because they are similar to the described processings, the description thereof is omitted here.

Next, description will be given below of a second embodiment of a lens apparatus according to the invention with reference to the accompanying drawings.

The structure of the lens apparatus according to the present embodiment is similar to that of the above-mentioned first embodiment and, therefore, the description thereof is omitted here.

In the previously described first embodiment, it is necessary to check whether the focus lens 50 is situated in the HIGH area or in the LOW area (Step S10); however, in the present embodiment, by omitting this checking operation, the program can be simplified.

Figure 12:
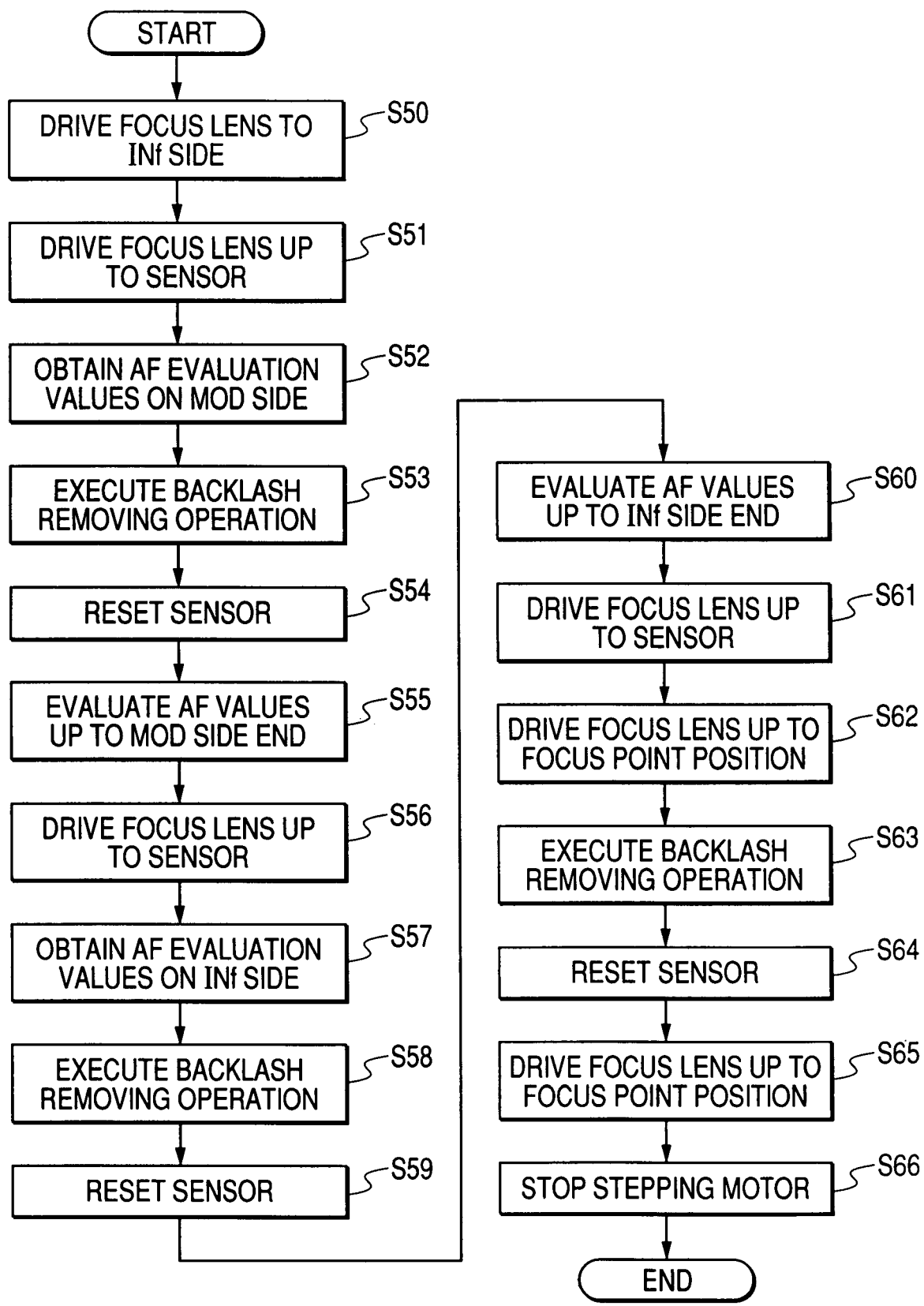
FIG. 12 shows a flow chart of the operation (second embodiment) of the lens apparatus.
Figure 13:
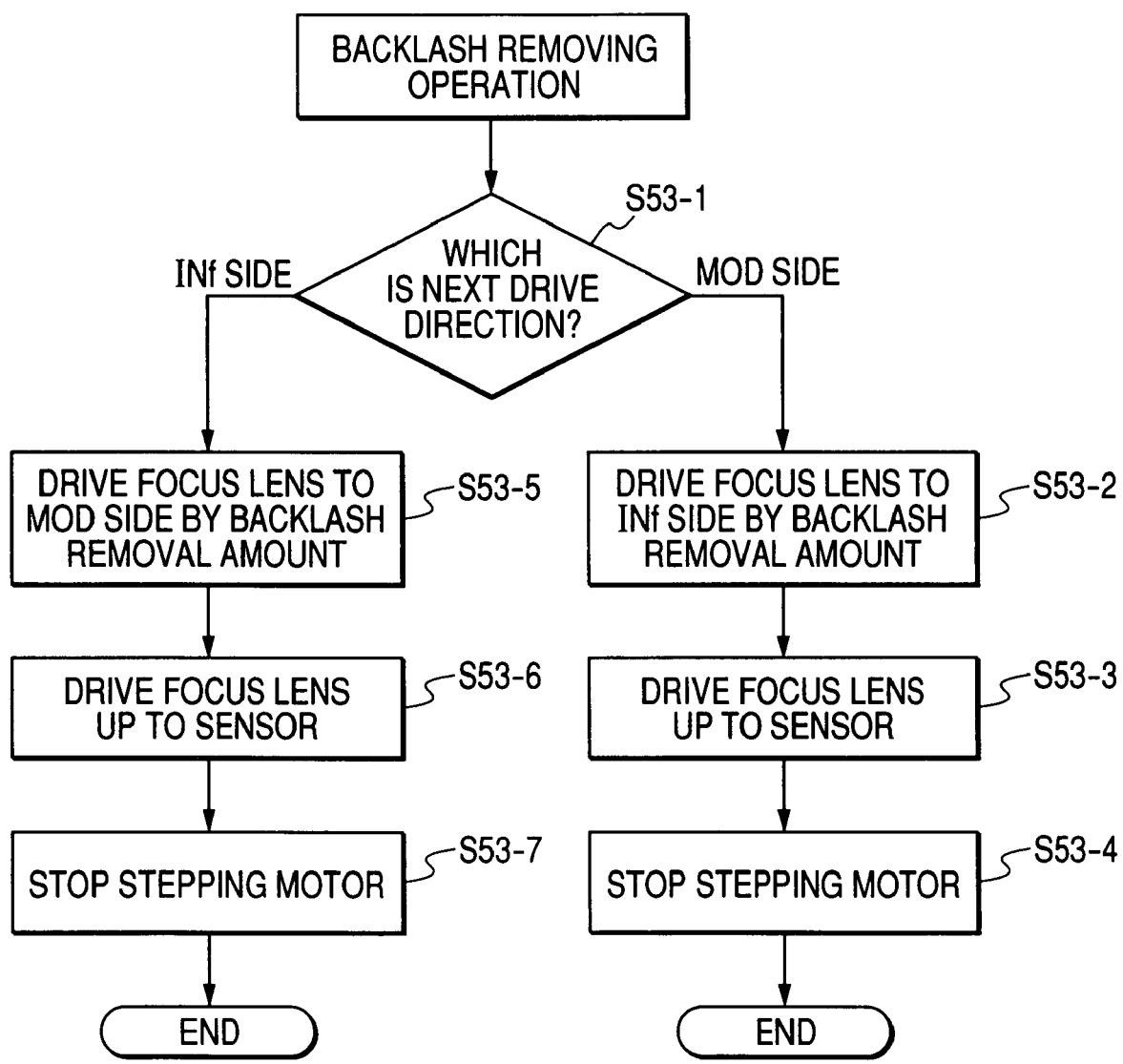
FIG. 13 shows a flow chart of the operation (second embodiment) of the lens apparatus.
Figure 14:
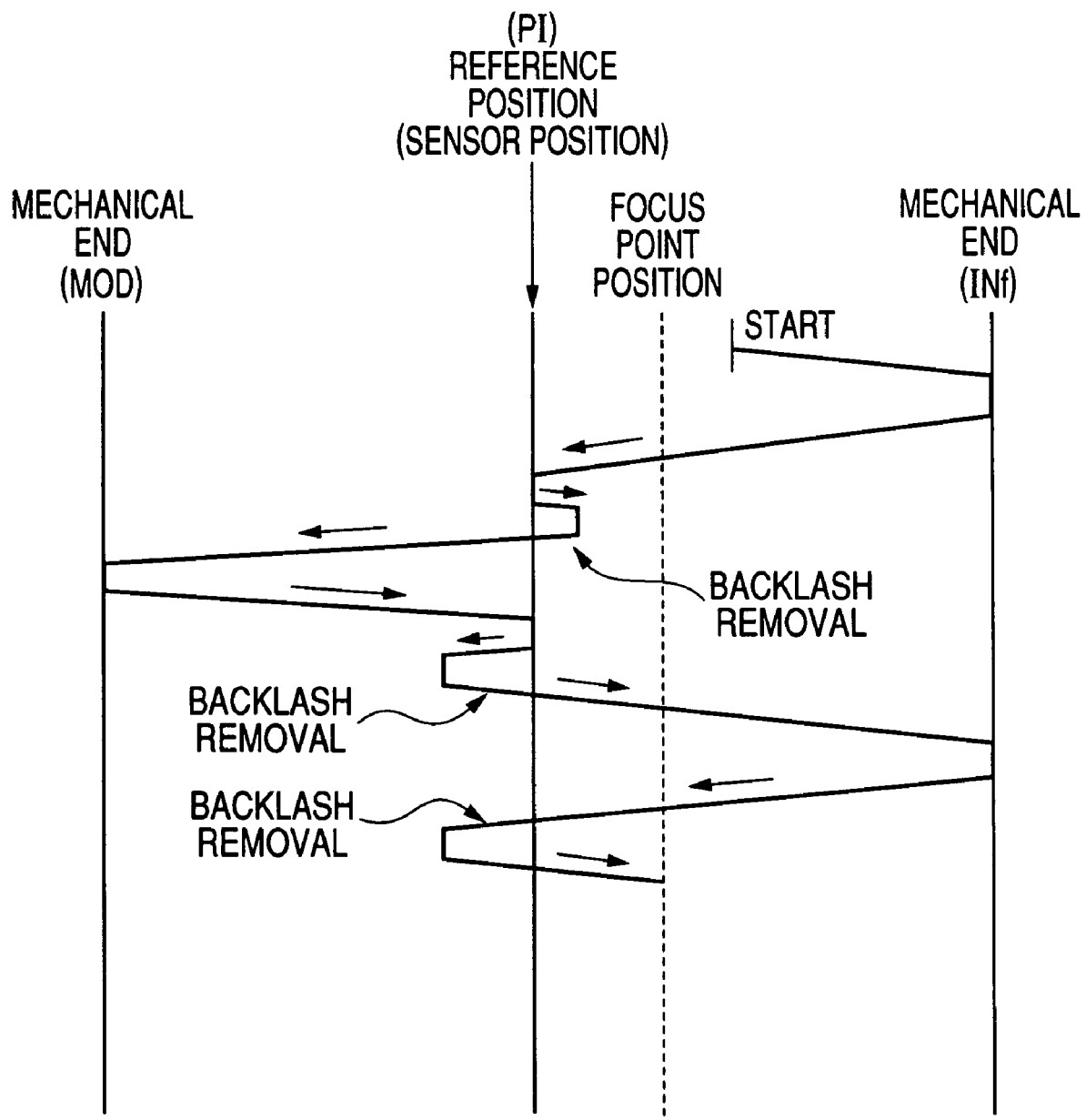
FIG. 14 shows the movement (second embodiment) of the focus lens.

FIGS. 12 and 13 are respectively flow charts of the operation of the lens apparatus 10 according to the second embodiment. And, FIG. 14 is an explanatory view of the movement of the focus lens 50 in the lens apparatus 10 according to the second embodiment.

Firstly, when the AF operation starts (or the power supply of the lens apparatus 10 is put to work), the stepping motor 40 is controlled such that the focus lens 50 is allowed to move from its original stop position toward one end or the other end (in FIG. 12, the mechanical end (INf)) of the optical lens stroke (Step 50). Specifically, a given number of pulses (for example, 2100 pulses) are applied to the stepping motor 40.

Soon, the focus lens 50 reaches the other end (the mechanical end (INf)) of the optical lens stroke (that is, the projecting portion (not shown) provided on the focus ring 30 is butted against the engaging member (not shown), while 2100 pulses have been applied to the stepping motor 40. Therefore, the stepping motor 40 rotates idly by an amount corresponding to a given number of pulses (stepping-out). After the 2100 pulses are applied to the stepping motor 40, the stepping motor 40 is controlled in such a manner that the focus lens 50 is allowed to move toward the reference position.

When it is detected that the focus lens 50 moves and reaches the reference position (that is, when it is detected that the output of the photo interrupter 60 is changed (from HIGH to LOW)) (Step 51), and also when there is given an instruction to the effect that a MOD side AF evaluation value should be obtained (Step S52), a backlash removing operation is executed (Step S53).

Here, description will be given of the backlash removing operation with reference to FIG. 13.

Firstly, the next drive direction is judged (Step S53-1). The judgment is performed by planned moving direction-judging means, which may be included in the control unit. Here, because, in Step S52, there is given an instruction to the effect that a MOD side AF evaluation value should be obtained, the drive direction is judged to be the MOD side (Step S53-1:

MOD side). Next, the stepping motor 40 is controlled such that the focus lens 50 is allowed to move by an amount equivalent to the backlash removal toward the direction of the side (here, the INf side) opposite to the MOD side judged (Step S53-2). After then, the stepping motor 40 is controlled such that the focus lens 50 is allowed to move up to the reference position (Step S53-3) and, when it is detected that the focus lens 50 reaches the reference position (that is, when it is detected that the output of the photo interrupter 60 is changed (from LOW to HIGH), the operation of the stepping motor 40 is caused to stop (Step S53-4).

When the backlash removing operation is completed, the counter for counting the feed amount of the focus lens 50 is reset (Step S54).

Next, a given number of pulses (for example, 2100 pulses) are applied to the stepping motor 40 in order to move the focus lens 50 from the reference position to one end (the mechanical end (MOD)) of the optical lens stroke.

While the focus lens 50 is moving from the reference position toward one end (the mechanical end (MOD)) of the optical lens stroke with no backlash existing, the AF evaluation values are sampled according to the lens positions (Step S55). AF evaluation values may be obtained by AF evaluation value-obtaining means, which may be included in control unit. And, there is found a curve which passes through, of the two or more AF evaluation values that have been sampled, two or more AF evaluation values including a maximum AF evaluation value; and, there is also found a lens position (a focus point position) where the curve provides maximum. The focus point position may be determined by focus point position-determining means, which may be included in the control unit. FIG. 5 shows an example of the curve that passes through the AF evaluation values.

Soon, the focus lens 50 reaches one end (the mechanical end (MOD)) of the optical lens stroke (that is, the projecting portion (not shown) provided on the focus ring 30 is butted against the engaging member (not shown), while 2100 pulses have been applied to the stepping motor 40. Therefore, the stepping motor 40 rotates idly by an amount corresponding to a given number of pulses (stepping-out).

After the 2100 pulses are applied to the stepping motor 40, the stepping motor 40 is controlled in such a manner that the focus lens 50 is allowed to move toward the other end (the mechanical end (INf)) of the optical lens stroke (Step S56) (during this operation, the sampling of the evaluation values is not carried out).

When it is detected that the focus lens 50 moves and reaches the reference position (that is, when it is detected that the output of the photo interrupter 60 is changed (from LOW to HIGH), and also when there is given an instruction to the effect that an INf side evaluation value should be obtained (Step S57), the backlash removing operation (Step S53) is executed.

That is, firstly, the next drive direction is judged (Step S53-1). Here, because, in Step S57, there is given an instruction to the effect that an INf side AF evaluation value should be obtained, the drive direction is judged to be the INf side (Step S53-1: INf side). Next, the stepping motor 40 is controlled such that the focus lens 50 is allowed to move by an amount equivalent to the backlash removal toward the direction of the side (here, the MOD side) opposite to the INf side judged (Step S53-5). After then, the stepping motor 40 is controlled such that the focus lens 50 is allowed to move up to the reference position (Step S53-6) and, when it is detected that the focus lens 50 has reached the reference position (that is, when it is detected that the output of the photo interrupter 60 is changed (from LOW to HIGH), the operation of the stepping motor 40 is caused to stop (Step S53-7).

When the backlash removing operation is completed, the counter for counting the feed amount of the focus lens 50 is reset (Step S59).

Next, a given number of pulses (for example, 2100 pulses) are applied to the stepping motor 40 in order to move the focus lens 50 from the reference position to the other end (the mechanical end (INf)) of the optical lens stroke.

During the time as well while the focus lens 50 is moving from the reference position toward the other end (the mechanical end (INf)) of the optical lens stroke with no backlash existing, the AF evaluation values are sampled according to the lens positions (Step S60). And, there is found a curve which passes through, of the two or more AF evaluation values that have been sampled, two or more AF evaluation values including a maximum AF evaluation value; and, there is also found a lens position (a focus point position) where the curve provides maximum.

Soon, the focus lens 50 reaches the other end (the mechanical end (INf)) of the optical lens stroke (that is, the projecting portion (not shown) provided on the focus ring 30 is butted against the engaging member (not shown), while the 2100 pulses have been applied to the stepping motor 40. Therefore, the stepping motor 40 rotates idly by an amount corresponding to a given number of pulses (stepping-out).

After the 2100 pulses are applied to the stepping motor 40, the stepping motor 40 is controlled in such a manner that the focus lens 50 is allowed to move toward the reference position (Step S61) (during this operation, the sampling of the evaluation values is not carried out). When it is detected that the focus lens 50 moves and reaches the reference position (that is, when it is detected that the output of the photo interrupter 60 is changed (from HIGH to LOW), and also when a focus point position is determined (Step S62), the backlash removing operation is executed (Step S63).

That is, firstly, the next drive direction is judged (Step S53-1). For example, when the focus point position is determined to be in the HIGH area, the drive direction is judged to be the INf side (or, when the focus point position is determined to be in the LOW area, the drive direction is judged to be the MOD side). From now on, processings in Steps S53-2~S53-7 are carried out. However, these processings are similar to the processings that have been described above and thus the description thereof is omitted here.

When the backlash removing operation is completed, the counter for counting the feed amount of the focus lens 50 is reset (Step S64).

And, the stepping motor 40 is controlled such that the focus lens 50 is allowed to move from the reference position to the determined lens position (focus point position) (Step S65), and the stepping motor 40 is then caused to stop (Step S66). This completes the AF operation.

As has been described above, according to the lens apparatus 10 of the present embodiment, when the focus lens 50 moves from the reference position to the MOD side or to the INf side, the focus lens 50 moves by a given amount in the direction opposite to the planned moving direction that is a direction in which it is planned to move, thereby executing a backlash removing operation for cancellation of the backlash (Steps S53, S58, S63).

Therefore, the backlash can be removed positively. Also, differently from the previously mentioned first embodiment, the operation to judge whether the focus lens 50 is situated in the HIGH area or in the LOW area is omitted. This makes it possible to simplify the program.

Next, description will be given below of the modifications of the embodiments according to the invention.

In the above-mentioned embodiments, the AF evaluation values are sampled over the entire area of the optical lens stroke (Step S13, Step S15). However, the invention is not limited to this.

Figure 6:
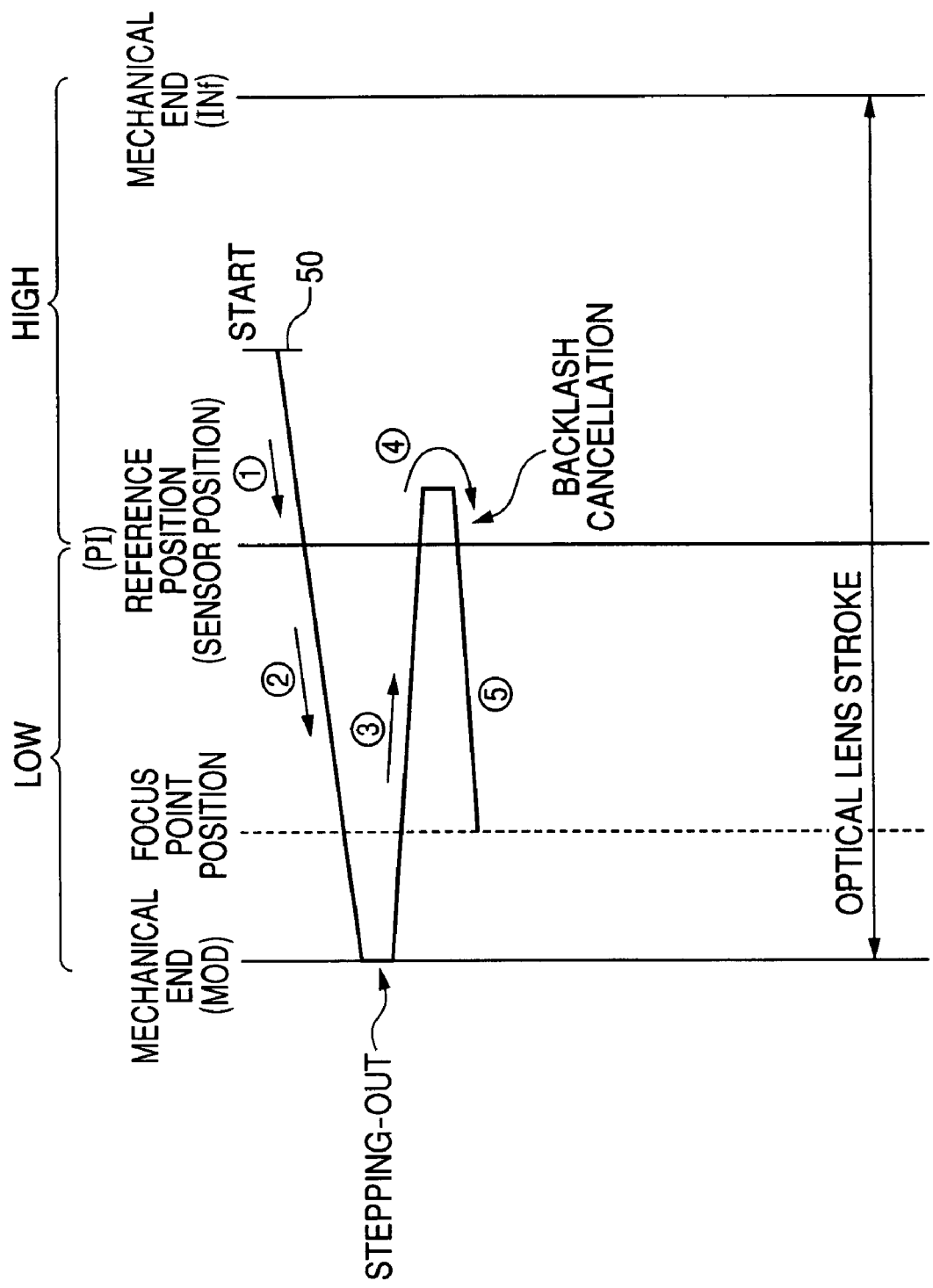
FIG. 6 shows the movement (modification) of the focus lens.
Figure 7:
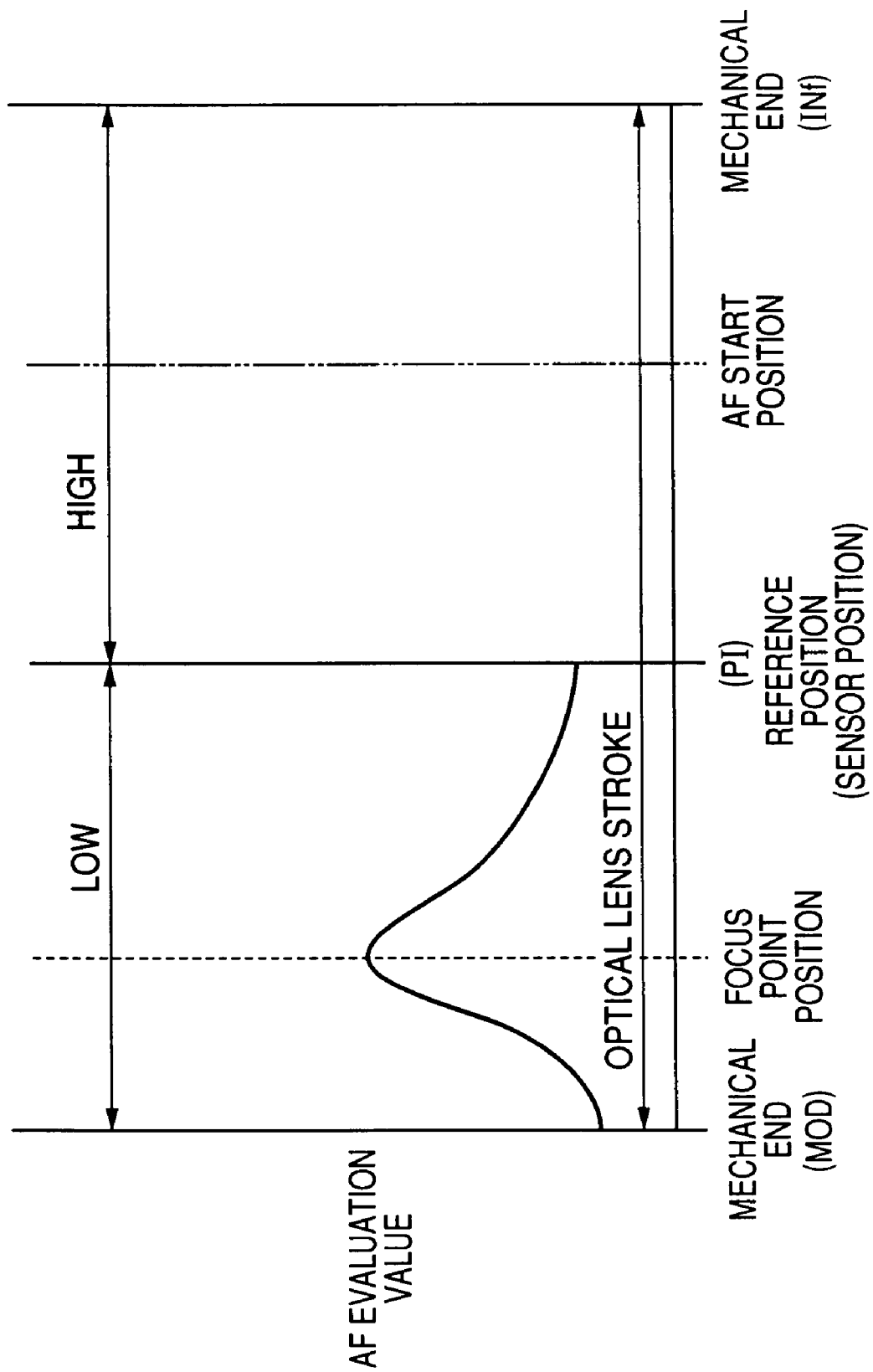
FIG. 7 shows another example of the AF evaluation value.

For example, as shown in FIG. 7, when, in Step S13, a focus point position is determined to be between the reference position and one end (the mechanical end (MOD) of the optical lens stroke), the processings in Steps 15 and 16 may not be executed. That is, the AF evaluation values may be sampled in a partial area of the optical lens stroke. The movement of the focus lens 50 in this case is as shown in FIG. 6.

According to this modification, when the focus point position is determined to be between the reference position and one end (the mechanical end (MOD)) of the optical lens stroke, the processings in Steps 15 and 16 are not executed when compared with a case where the focus point position is determined to be between the reference position and the other end (the mechanical end (INf)) of the optical lens stroke. Thanks to this, the backlash can be removed positively and quickly.

Figure 8:
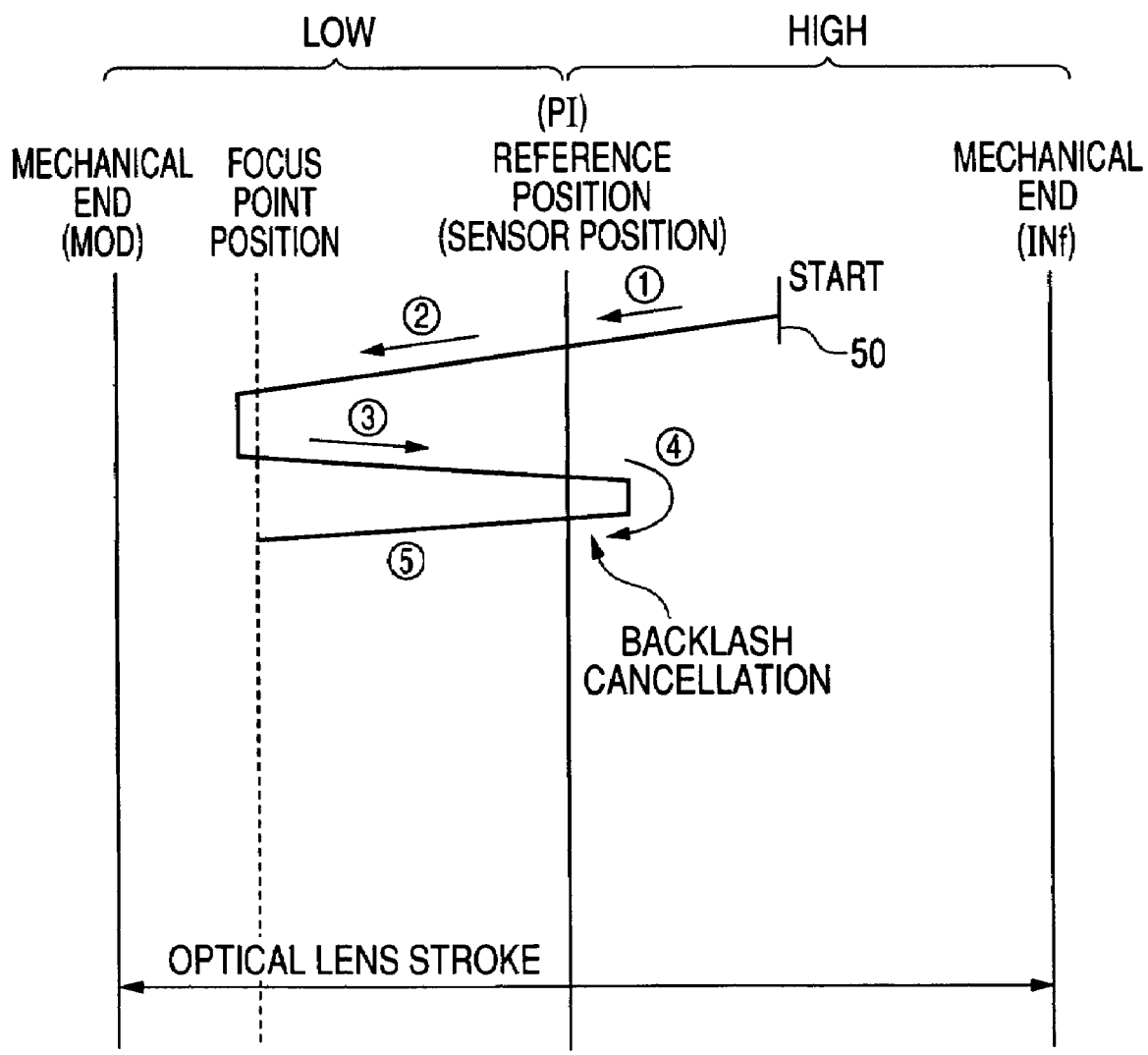
FIG. 8 shows the movement (modification) of the focus lens.

Or, as shown in FIG. 7, when, in Step S13, the focus point position is determined to be between the reference position and one end (the mechanical end (MOD)) of the optical lens stroke, the stepping motor 40 may be controlled such that the focus lens 50 is allowed to move immediately (that is, from the then position without reaching one end of the optical lens stroke) toward the other end (the mechanical end (INf)) of the optical lens stroke. The movement of the focus lens 50 in this case is as shown in FIG. 8. In this case, the backlash can be removed positively and quickly.

Also, according to the above-mentioned embodiments, for example, by rotating the focus ring 30 manually, the focus lens 50 may be moved substantially to the focus point position and, after then, the processings shown in FIG. 3 may be executed. In this case, the backlash can be removed positively and quickly.

The above-mentioned embodiments are just examples of the invention all along the line. The invention is not limited to the description of these embodiments. The invention can also be enforced in other various modes without departing from the spirit and main aspects of the invention.

This application claims foreign priority from Japanese Patent Application No. 2006-40202, filed Feb. 17, 2006, the entire disclosure of which is herein incorporated by reference.

What is claimed is:

1. A lens apparatus comprising:
a focus lens;
a drive source generating a driving force to move the focus lens forward or backward within an optical lens stroke of the focus lens;
a gear train transmitting the driving force to the focus lens;
a sensor detecting that the focus lens reaches a reference position in the optical lens stroke; and
a controller,
wherein
the drive source is controlled by the controller so as to cause the gear train to transmit a driving force to the focus lens to move the focus lens from the reference position to a first one of end limits of the optical lens stroke and then to move the focus lens from the first one of the end limits to a second one of the end limits of the optical lens stroke, while AF evaluation values with respect to positions of the focus lens are obtained to determine a position, in the optical lens stroke between the two end limits, of the focus lens coming into focus, and then causing the focus lens to move from the second one of the end limits of the optical lens stoke toward the reference position, and when the position of the focus lens coming into focus is determined to be between the reference position and the second one of the end limits of the optical lens stroke and the sensor thereafter detects that the focus lens reaches the reference position, the drive source is controlled by the controller so as to cause the gear train to transmit a driving force to the focus lens to move the focus lens from the reference position toward the first one of the end limits of the optical lens stroke by a distance to remove a backlash of the gear train, and then causing the focus lens to move up to the position of the focus lens coming into focus.

2. The lens apparatus according to claim 1, wherein when the position of the focus lens coming into focus is determined to be between the reference position and the first one of the end limits of the optical lens stroke and the sensor thereafter detects that the focus lens reaches the reference position, the drive source is controlled by the controller so as to cause the gear train to transmit driving force to the focus lens to move the focus lens from the reference position to the position of the focus lens coming into focus.

3. A lens apparatus comprising:
a focus lens;
a drive source generating a driving force to move the focus lens forward or backward within an optical lens stroke of the focus lens;
a gear train transmitting the driving force to the focus lens;
a sensor detecting that the focus lens reaches a reference position in the optical lens stroke; and
a controller,
wherein
the drive source is controlled by the controller so as to cause the gear train to transmit a driving force to the focus lens to move the focus lens from the reference position toward a first one of end limits of the optical lens stroke, and then causing the focus lens to move toward the reference position at a timing after a position of the focus lens coming into focus is determined to be between the reference position and the first one of the end limits of the optical lens stroke, and when the sensor detects that the focus lens reaches the reference position, the drive source is controlled by the controller so as to cause the gear train to transmit a driving force to the focus lens to move the focus lens from the reference position toward the second one of the end limits of the optical lens stroke by a distance to remove a backlash of the gear train, and then causing the focus lens to move up to the position of the focus lens coming into focus.

4. A lens apparatus comprising:
a focus lens;
a drive source generating a driving force to move the focus lens forward or backward within an optical lens stroke of the focus lens;
a gear train transmitting the driving force to the focus lens;
a sensor detecting that the focus lens reaches a reference position in the optical lens stroke; and
a controller,
wherein
the drive source is controlled by the controller so as to cause the gear train to transmit a driving force to the focus lens to move the focus lens toward a first or a second one of two end limits of the optical lens stroke, and when the sensor detects that the focus lens reaches the reference position and a first direction in which the focus lens is planned to move is determined, the drive source is controlled thereafter so as to cause the gear train to transmit a driving force to the focus lens to move the focus lens from the reference position in a second direction opposite to the first direction by a distance to remove a backlash of the gear train, and then causing the focus lens to move in the first direction.

5. The lens apparatus according to claim 4, wherein the the controller causes the gear train to transmit a driving force to the focus lens to move the focus lens away from the first or second one of the two end limits toward the reference position after being moved toward the first or second one of the two end limits.

* * * * *